United States Patent [19]

Stagi

[11] Patent Number: 5,097,922
[45] Date of Patent: Mar. 24, 1992

[54] VEHICLE, IN PARTICULAR A MOTOR BICYCLE, DISAPPEARING IN A BODY

[76] Inventor: Marco Stagi, Via di Terranova, 82-, 52025 Montevarchi (Prov. of Arezzo), Italy

[21] Appl. No.: 578,286

[22] Filed: Sep. 6, 1980

[30] Foreign Application Priority Data

Sep. 6, 1989 [IT] Italy ............................. 21636 A/89

[51] Int. Cl.⁵ ................. B62K 15/00; A45C 9/00; A45C 7/00
[52] U.S. Cl. .................... 180/208; 180/219; 280/37; 190/104; 190/105; 190/1
[58] Field of Search ............ 180/208, 209, 219; 280/639, 641, 642, 643, 655, 655.1, 37, 30, 47.315; 296/26; 16/115, 125, 119; 190/103, 105, 1, 104

[56] References Cited

U.S. PATENT DOCUMENTS

| | | | |
|---|---|---|---|
| 2,938,734 | 5/1960 | Guimond | 280/47.315 |
| 3,314,494 | 4/1967 | Weitzner | 180/208 |
| 3,316,993 | 5/1967 | Weitzner | 180/208 |
| 3,354,975 | 11/1967 | Stuart | 180/208 |
| 3,417,834 | 12/1968 | Smith | 280/639 |
| 3,483,937 | 12/1969 | Vann | 180/208 |
| 3,796,439 | 3/1974 | Perego | 280/655.1 |
| 3,934,669 | 1/1976 | Adams | 180/208 |
| 4,094,374 | 6/1978 | Adams | 180/208 |
| 4,361,215 | 11/1982 | Sawai | 190/103 |
| 4,448,434 | 5/1984 | Anderson | 280/655 |

*Primary Examiner*—Charles A. Marmor
*Assistant Examiner*—Tamara L. Finlay

[57] ABSTRACT

An extensible motor bicycle is equipped with a body virtually in the form of a suitcase. The body houses within itself, at least partially, several mechanical members necessary for motion and an actuating device operatively connected to the members and capable of automatically controlling coming out and return within the body.

16 Claims, 10 Drawing Sheets

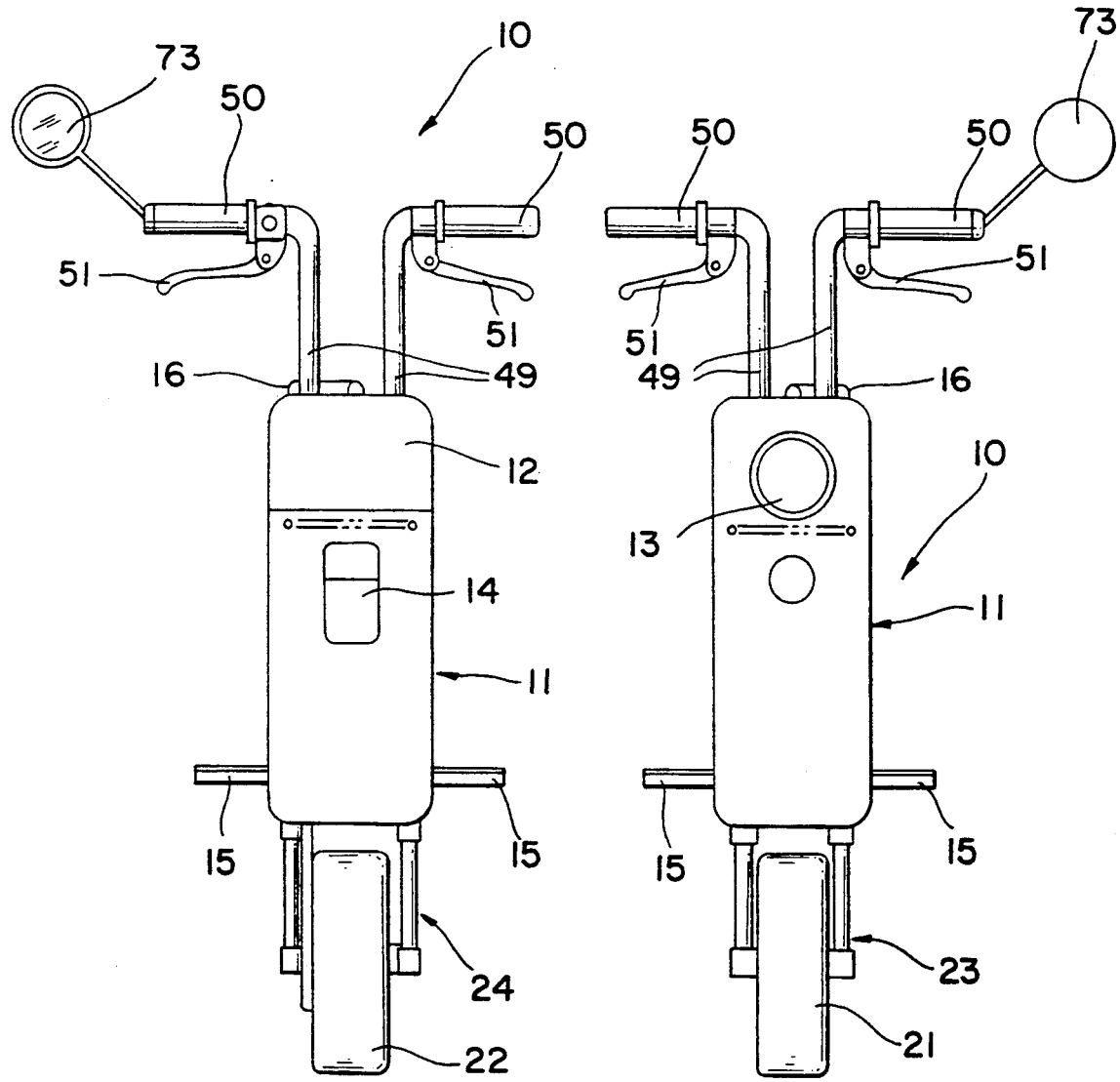

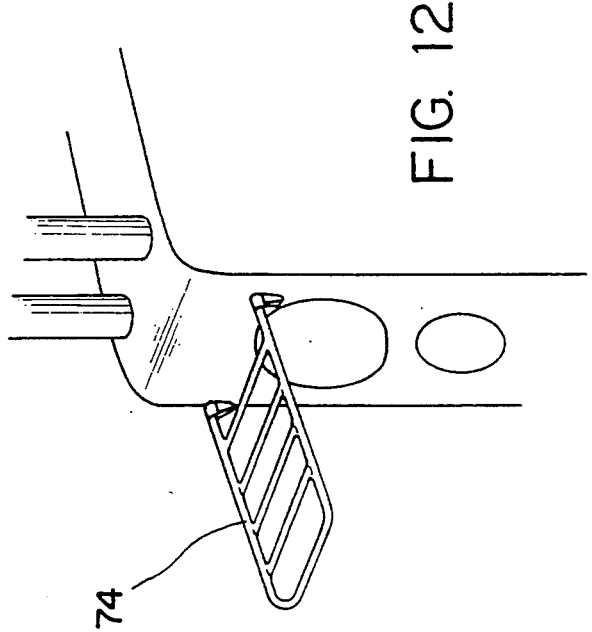
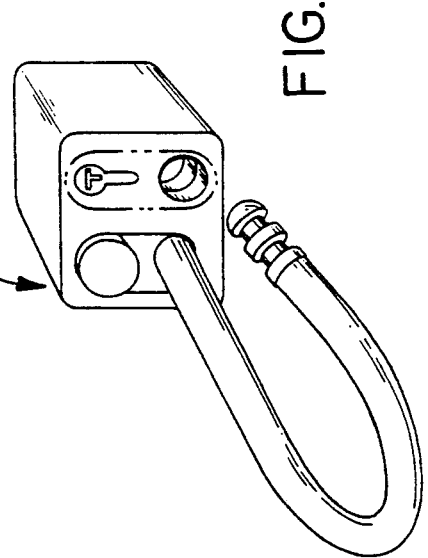
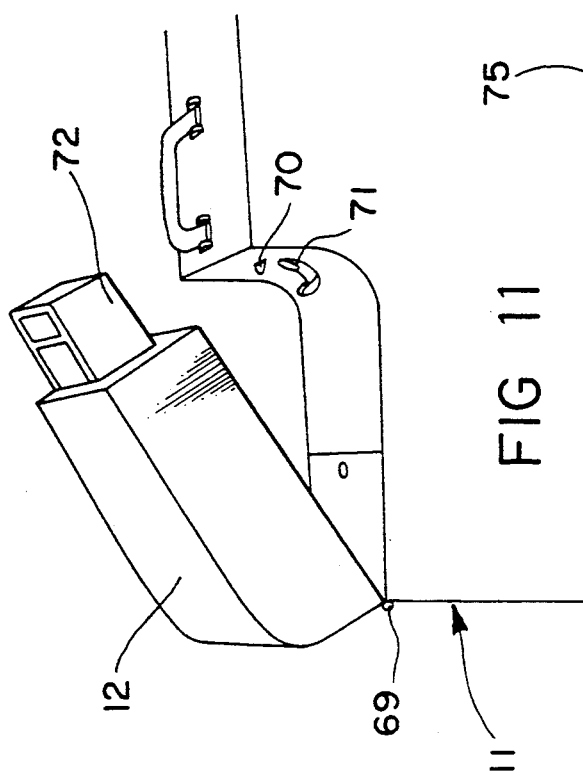

VEHICLE, IN PARTICULAR A MOTOR BICYCLE, DISAPPEARING IN A BODY

FIELD OF THE INVENTION

The present invention relates to an extensible vehicle, in particular a motor bicycle which, under resting conditions, assumes a contracted configuration and which at the time of use unfolds to assume an extended configuration of operation.

PRIOR ART

At present there are folding vehicles in trade and in particular motor bicycles in which the chassis is formed of articulated or telescopic parts which can be folded or can contract so as to allow their transport by another means of locomotion, such as an automobile, e.g. in extraurban ways, and their use in urban traffic as an alternative to said automobile.

In some cases the tubular rods of the handle bars are articulated and can be folded back on the central part of the chassis, in relation with which the seat can also be raised or lowered.

In other cases the fork itself, which supports the front wheel, is articulated and can be laid over the central part of the chassis.

Vehicles of this type and particularly folding motor bicycles are not very practical because they require rather laborious operations for folding and unfolding and because in the rest configuration they are difficult to handle.

SUMMARY OF THE INVENTION

The object of the present invention is an extensible vehicle, and particularly an extensible motor bicycle, which would not have the shortcomings of the known ones, which are folding, but which would be functional and occupy little space. Another object of the invention is an extensible vehicle which would have a particularly compact and manageable configuration at rest and could be made usable simply and quickly.

A further object of the invention is an extensible vehicle which would be an optimized solution from the viewpoint of performance and also attractive in appearance.

In accordance with the invention, there has been conceived an extensible vehicle, in particular an extensible motor bicycle, comprising at least one power unit, wheels and associated suspensions, handle bars, and a seat, the vehicle being characterized in that it is equipped with a body which has substantially the structure of a geometric solid and is capable of housing within itself, at least partially, in rest conditions, at least the said power units, wheels and associated suspensions.

In accordance with a preferred embodiment, said body also houses within itself first actuating means operatively connected at least to said wheels to control their lowering and rising from the rest condition, at least partially retracted inside said body, to the operating condition, at least partially extracted outside of said body, and vice versa.

In accordance with another preferred embodiment, said body also houses within itself at least partially the rods of said handle bars and second actuating means are operatively connected to said rods to control rising and lowering thereof from the rest condition, at least partially retracted inside said body, to the operating condition, at least partially extracted outside of said body, and vice versa.

In accordance with another preferred embodiment, said body is of the monocoque type with incorporated frame and is substantially in the form of a suitcase and has a handle.

Advantageously said seat is incorporated in said body. The proposed vehicle is particularly practical, because under rest conditions, it can disappear even entirely in its own body and is easy to transport by another means of locomotion; then, when it is needed, it be can made usable simply and quickly.

Further scope of applicability of the present invention will become apparent from the detailed description given hereinafter. However, it should be under stood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Characteristics and advantages of the invention will now be explained with reference to FIGS. 1-16 wherein are represented as nonlimiting examples preferred embodiments of said invention.

FIGS. 7-10 are a side, rear, front and perspective view respectively of the vehicle in operating conditions.

FIGS. 11-13 show some accessories of the vehicle illustrated in FIGS. 1-10, and

DETAILED DESCRIPTION OF THE PREFERRED EMBODIMENTS

Figure 1:
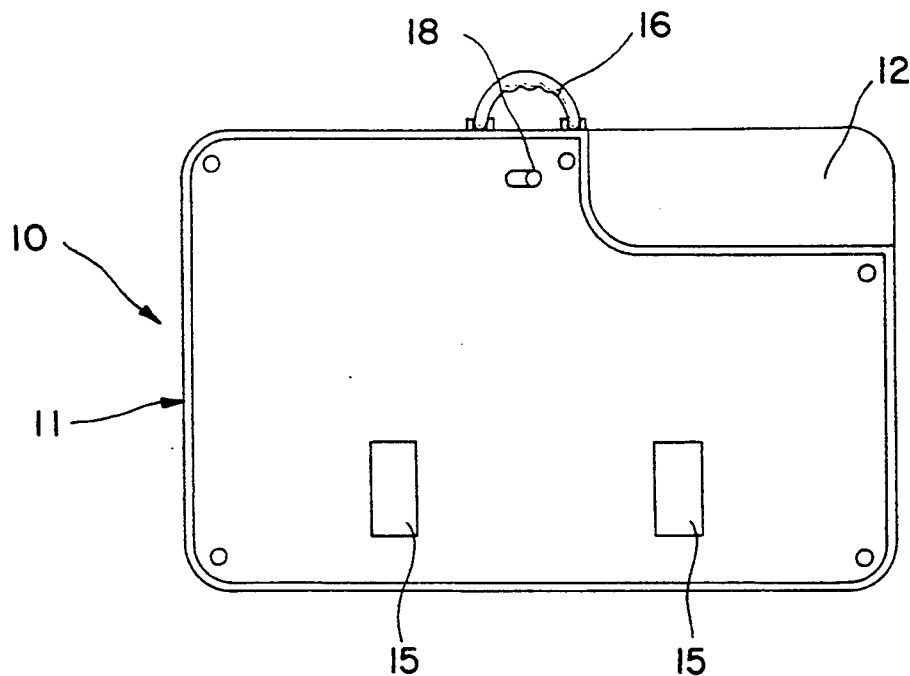
FIGS. 1-4 are a side, rear, front and perspective view respectively of the vehicle in accordance with the invention in a rest condition.
Figure 2:
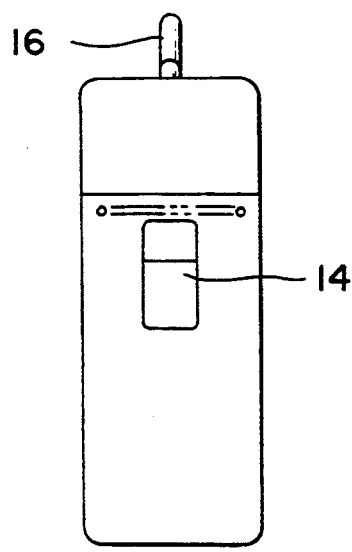
Figure 3:
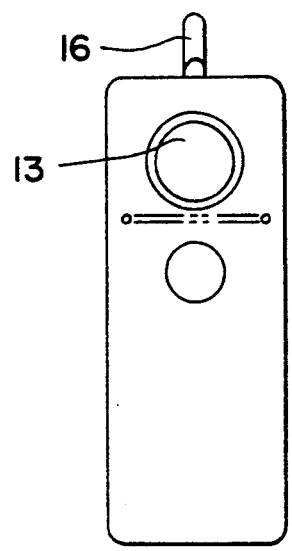
Figure 4:
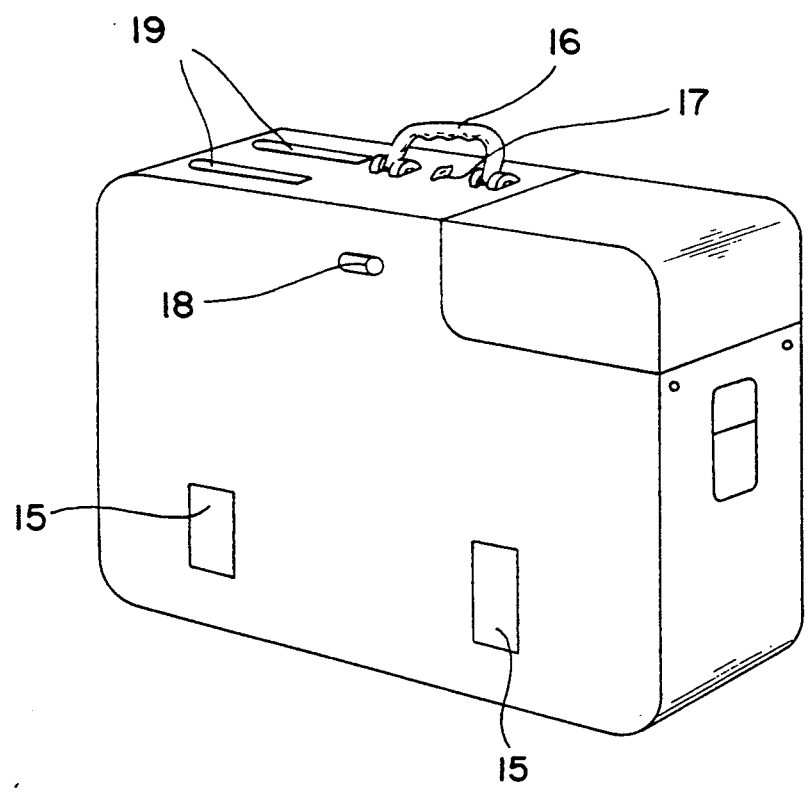

In FIGS. 1-4 reference number 10 indicates the overall extensible motor bicycle made in accordance with the invention and represented in rest condition and reference number 11 indicates the overall body which functions as a frame and can be of the monocoque type with the frame incorporated thereon or with the frame mounted separately. The body 11 has the structure of a geometric solid, substantially that of a parallelepiped with rounded edges, of the suitcase type, but without the bottom wall, and with an opening side wall, for maintenance.

The body 11 with a suitcase structure is preferably made of a suitable plastic, optionally reinforced with glass or carbon fibres, and has an optimized design to obtain the necessary resistance to operating stresses.

The body 11 incorporates in the top wall a seat indicated by reference number 12, in the smaller side walls a headlight 13 and a taillight 14, and in the larger side walls pairs of extractible pedals 15. The body 11 has a handle, indicated by reference number 16. Handle 16 allows lifting of the motor bicycle 10. A housing 17 for a key and a control button 18 are also provided on body 11. The control button 18 and an electromagnet 36 comprise a control device.

In the top wall of the body 11 there is a pair of rectangular openings indicated by reference number 19.

Figure 5:
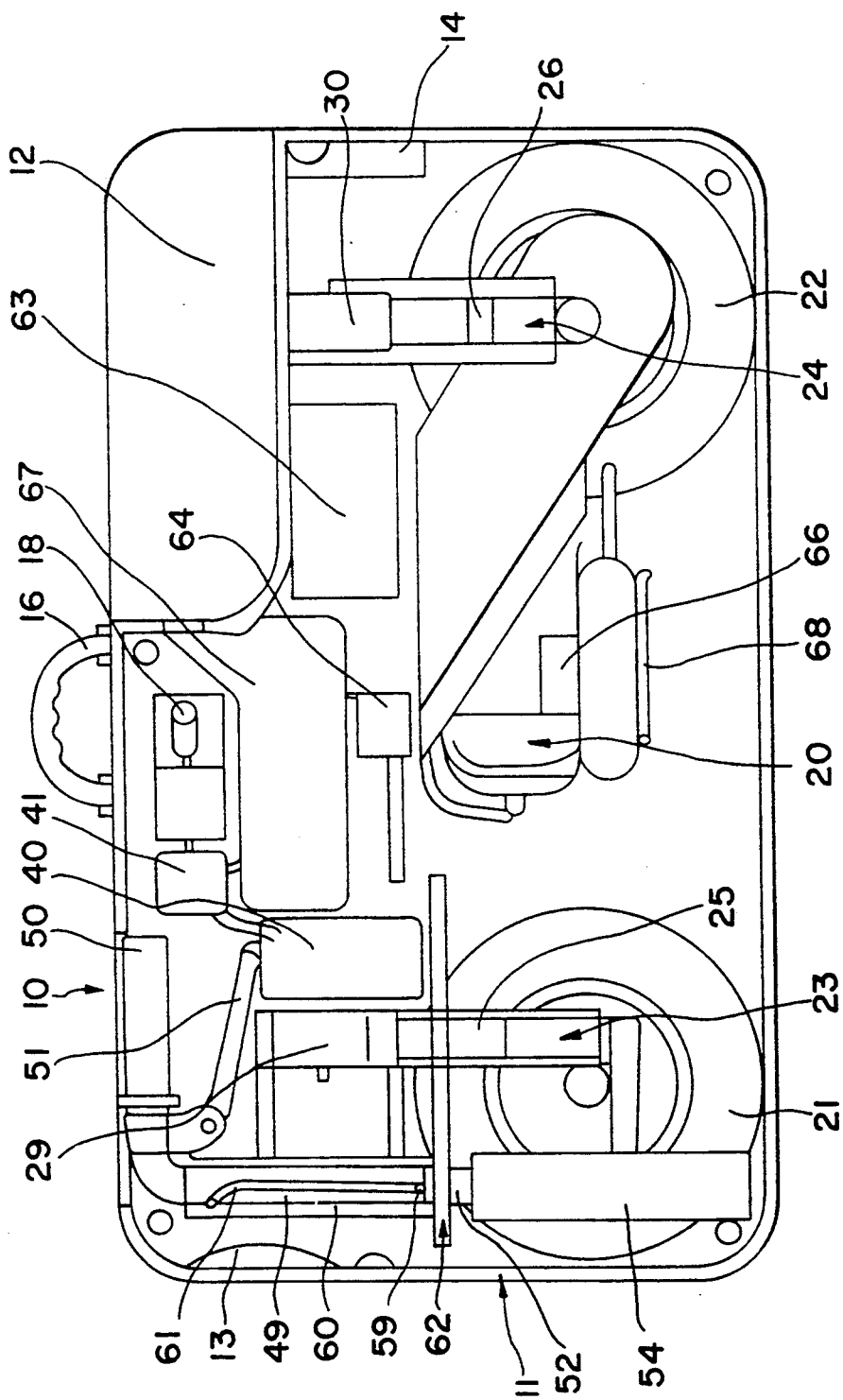
FIG. 5 is a transparent view in enlarged scale of the vehicle of FIG. 1.

As shown in FIG. 5, inside the body 11 are housed in rest position the members and components necessary for motion of the motor bicycle 10.

Reference number 20 indicates the entire power unit comprising an internal combustion motor, e.g. a one-cylinder 2-stroke motor, or an electric motor, and a transmission, e.g. consisting of gears and a chain.

Figure 6:
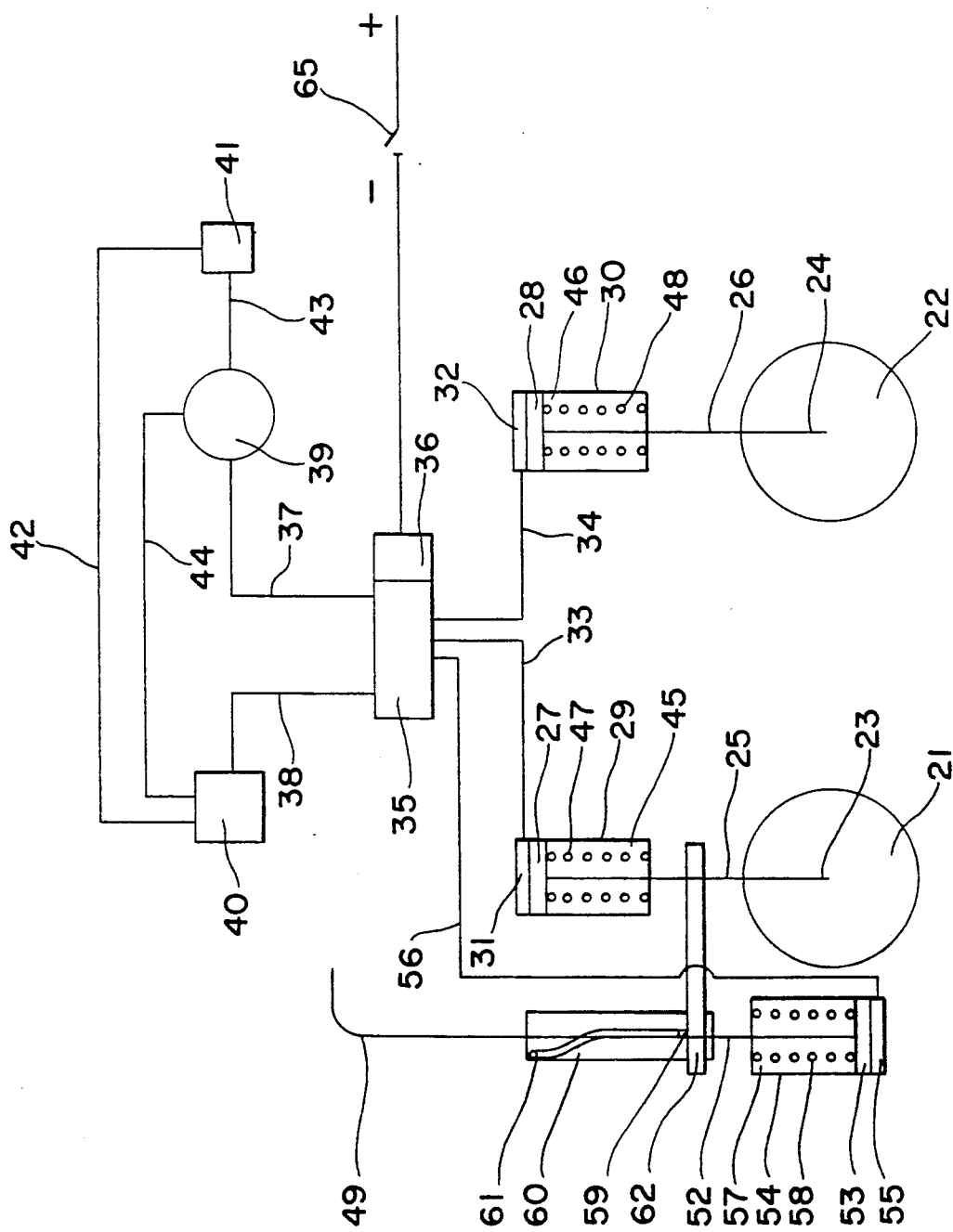
FIG. 6 is a schematic view of some components of the vehicle shown in FIG. 5.
Figure 7:
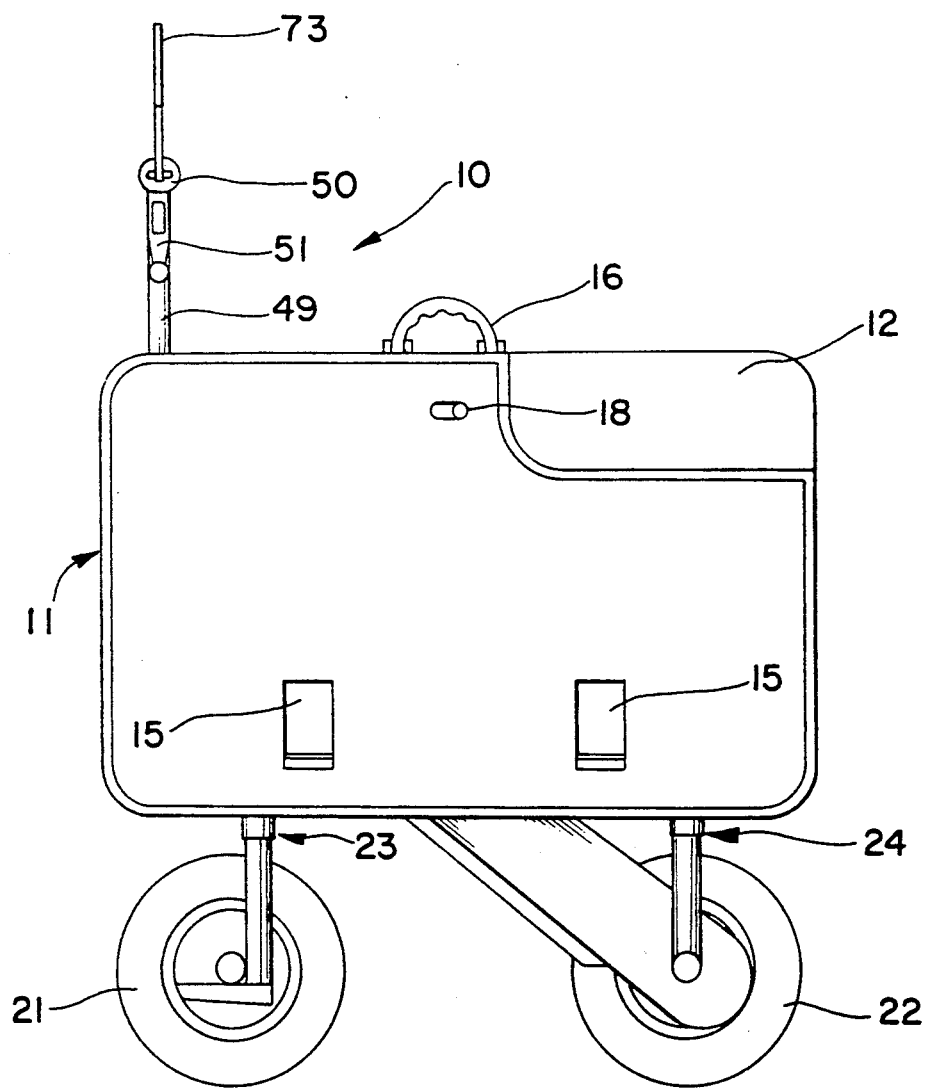

Reference numbers 21 and 22 indicated the front and rear wheels of the motor bicycle and 23 and 24 indicate as a whole the associated suspensions made up of the forks integral with the rods 25 and 26 of two pistons 27 and 28 which are also shown in FIG. 6. The pistons 27 and 28 slide in the cylinders 29 and 30 which are fixed to the body 11. The variable volume chambers 31 and 32 of the cylinders 29 and 30 are connected as shown in FIG. 6, by ducts 33 and 34 to a slide valve actuated by an electromagnet represented schematically by blocks 35 and 36. The valve 35 is controlled by the electromagnet 36 and by a suitable spring, not shown, to slide between two stop positions in which it provides communication between the ducts 33 and 34 and a duct 37 for supplying of a pressurized fluid and alternatively a duct 38 for discharging said fluid.

Reference numbers 39, 40 and 41 indicate respectively the accumulator of the fluid under pressure, the tank for said fluid and a pump or feed compressor depending on whether the fluid under pressure is oil or air.

Reference numbers 42, 43 and 44 indicate the ducts connecting them. In the variable volume chambers 45 and 46 of the cylinders 29 and 30 are arranged respective compression springs 47 and 48 engaged with pistons 27 and 28 respectively. In the place of or even in combination with the springs, the chambers 45 and 46 could be connected by ducts to a slide valve similar to 35 capable of providing communication between them and alternatively the tank 40 and the accumulator 39. Any shock absorbers operatively connected to the wheels 21 and 22 are not shown.

Reference number 49 indicates two tubular rods bent at the ends to form handle bars 50 of the motor bicycle and reference number 51 indicates two actuating levers connected to said handle bars. Handle bars and levers are not described in detail because they are known.

Each rod 49 is integral with the rod 52 of a respective piston 53 which slides in an associated cylinder 54. The cylinders 54 are connected to the body 11 in such a manner as to be able to rotate around a substantially vertical axis, not shown, which constitutes the axis of rotation of the rods 49 of the handle bars 50 during steering. Each variable volume chamber 55 of a cylinder 54 is connected through a duct 56 to the slide valve 35, which is capable of putting it in communication alternatively with the ducts 37 and 38.

In the variable volume chamber 57 of each cylinder 54 is arranged a compression spring 58 which engages with the associated piston 53. In this case also, in the place of, or in combination with the spring 58, the chamber 57 could be connected by means of a duct to a valve similar to 35 to be put in communication alternatively with the tank 40 and with the accumulator 39.

The rod 52 of each piston 53 has a pin 59 sliding in a partially helical groove 61 of a respective tubular sheath 60 which surrounds said rod 52.

Figure 10:
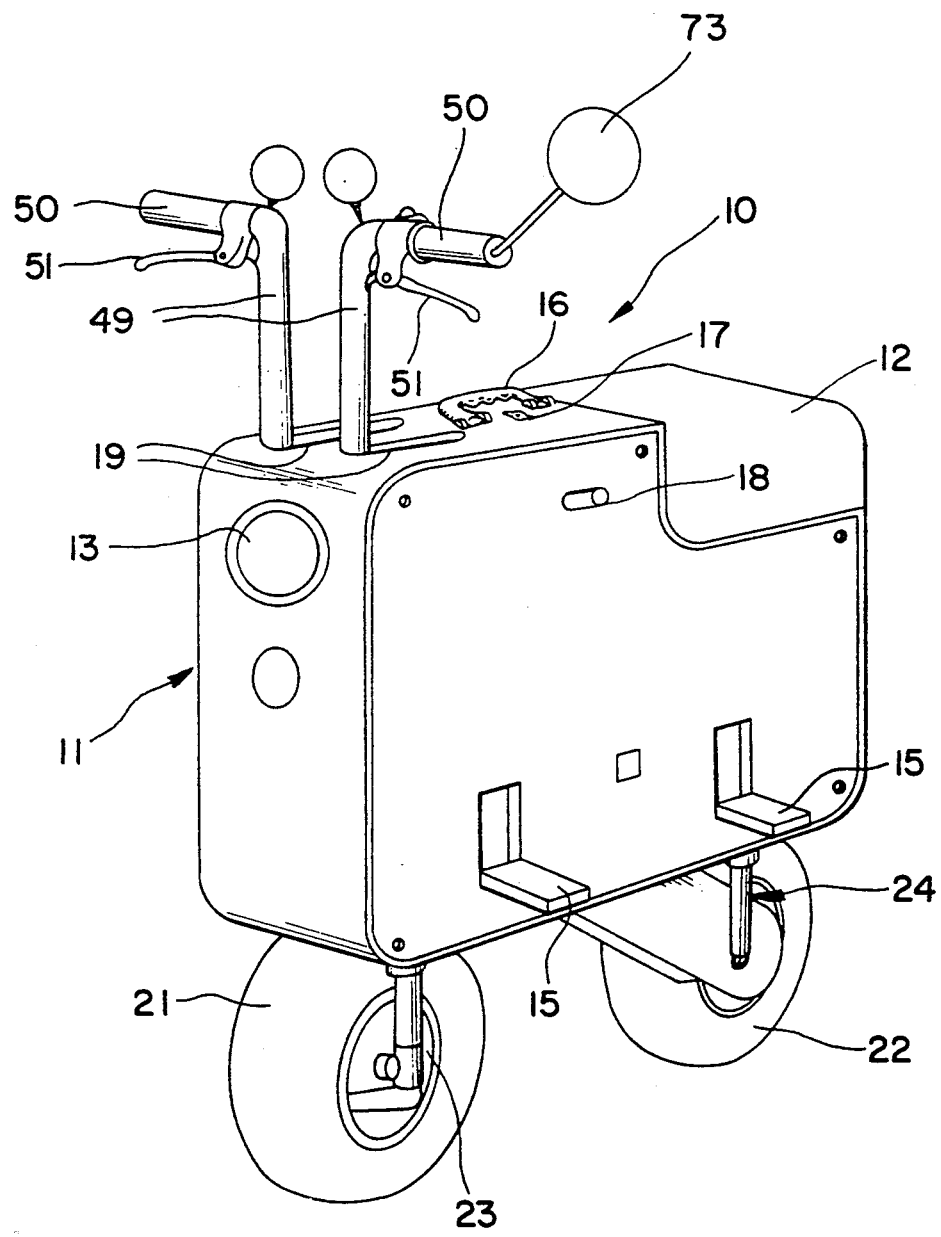

With this connection each rod 52 can slide vertically and simultaneously rotate around its own axis, causing corresponding rotations of the rods 49 during their rising and falling strokes in such a manner that the handle bars 50 rotate from the rest position, shown in FIG. 5, arranged in planes parallel to the longitudinal plane of the body 11 and turned rearward, to the operative position shown in FIGS. 8-10, where they are arranged in a transverse plane of said body 11 and turned outward.

The tubular sheaths 60 are connected to the body 11 in such a manner as to be able to rotate around said substantially vertical axis, which constitutes the axis of rotation of the rods 49 during steering.

The sheaths 60 and the fork of the suspension 23 are operatively interconnected by motion transmission members in such a manner that the rotations of the handle bars during steering control rotations of the wheel 21 around its steering axis, which consists of the substantially vertical axis of said fork.

For example the sheaths 60 and the rod 25 can be connected by two engaging gears shown schematically by the block indicated as a whole by reference number 62, providing that a gear can be rotated jointly with the sheaths 60 and the other gear can rotate jointly with said rod 25, while allowing vertical slidings, as would be possible by means of a splined coupling.

Alternately, there could be used a mechanism consisting of two cranks and a rod pivoted thereon.

The handle bars 50 and the rods 49 control the steering of the wheel 21 through the rods 52, the pins 59 engaged with the grooves 61, the tubular sheaths 60 and to the gears 62.

The two rods 49 could be controlled by a single piston 53 whose rod 52 would be integral with both rods; in this case the associated cylinder 54 would be fastened to the body 11 while the rod 52 would slide in a single tubular sheath 60 supported in a rotating manner in the body 11 and operatively connected to the wheel 21 to control steering, e.g. by means of gears as those of the block 62. The rods 49 would then have handle bars 50 which in the rest position would be directed in the opposite direction, forward and rearward, with reference to FIG. 5, and which with the coming out of the body 11, through an opening provided for this purpose, such as those indicated by reference number 19, would assume the operative position turned outward.

In FIG. 5 the blocks 63 and 64 represent schematically a battery and a generator of electrical energy operatively connected to the power unit 20. The battery 63 is in turn operatively connected to the various electrical devices of the motor bicycle including the electromagnet 36 of FIG. 6, which is controlled to be energized and deenergized by the closing and opning of the switch 65, which is opoerated by the pushbutton 18.

Blocks 66 and 67 show schematically a starting device and the fuel tank, connected to the carburettor, not shown, which supplies the engine of the power unit 20.

Reference number 68 indicates the motor bicycle stand.

As shown in FIG. 11, the seat 12 is connected to the body by pins 69 and can be locked by a lock and key 70 operated by the housing 17. Beneath the seat 12 is housed the filler 71 of the tank 67 with its cap.

Inside the seat 12 there is a drawer 72 designed for housing tools or accessories.

In FIGS. 7-10 reference number 73 indicates a rearview mirror fixed to a handle bar 50.

By pressing the push-button 18 from the rest position to the operative position, the switch 65 is closed and the electromagnet 36 is energized, so that the slide valve 35 is commanded to move to the operative position and put in communication the chambers 31, 32, 55 of the cylinders 29, 30, 54 with the duct 37 supplying fluid under pressure.

Under the effect of the fluid under pressure the pistons 27, 28, 53 perform an expansion stroke, pushing the wheels 21 and 22 to lower and the rods 49 of the handle bars 50 to rise and simultaneously rotate, coming out of the openings 19. Thus wheels and handle bars are extracted automatically from the interior of the body 11 and the motor bicycle assumes the extended operating configuration, as illustrated in FIGS. 7–10.

By returing the push-button 18 to the rest position, the switch 65 opens and the electromagnet 36 is deenergized so that the slide valve 35 returns to the rest position and puts in communication the chambers 31, 32, 55 of the cylinders 29, 30, 54 with the discharge duct 38 of the fluid under pressure.

Under the action of the springs 47, 48, 58, or even of said fluid under pressure, the pistons 27, 28, 53 perform a contraction stroke and push the wheels 21, 22 to rise and the rods 49 of the handle bars to rotate and lower simultaneously, so as to be retracted automatically in the interior of the body 11 and the motor bicycle returns to the rest configuration of FIGS. 1–4.

The power unit 20 is operatively connected to the wheels 22 by a transmission comprising preferably a chain so that the lowering and rising strokes of said wheel are allowed; or said unit 20 can be connected to the wheel 22 and to the body 11 so that it can move together with said wheel.

In substitution for the fluid actuators the lowering and rising strokes of the wheels 21, 22 and the rods 49 of the handle bars could be controlled by electromechanical actuators consisting of helical and worm gears or rack and pinions, and reversible electric motors energized by a commutator and the push-button 18.

In FIGS. 12 and 13, a luggage rack 74 and an antitheft device 75 are shown with which the motor bicycle can be equipped.

One of the side walls of the body 11 could be made up of two layers connected along the edges by a bellows to form a parcel bag usable by opening special hooks designed to hold the two layers together.

Figure 14:
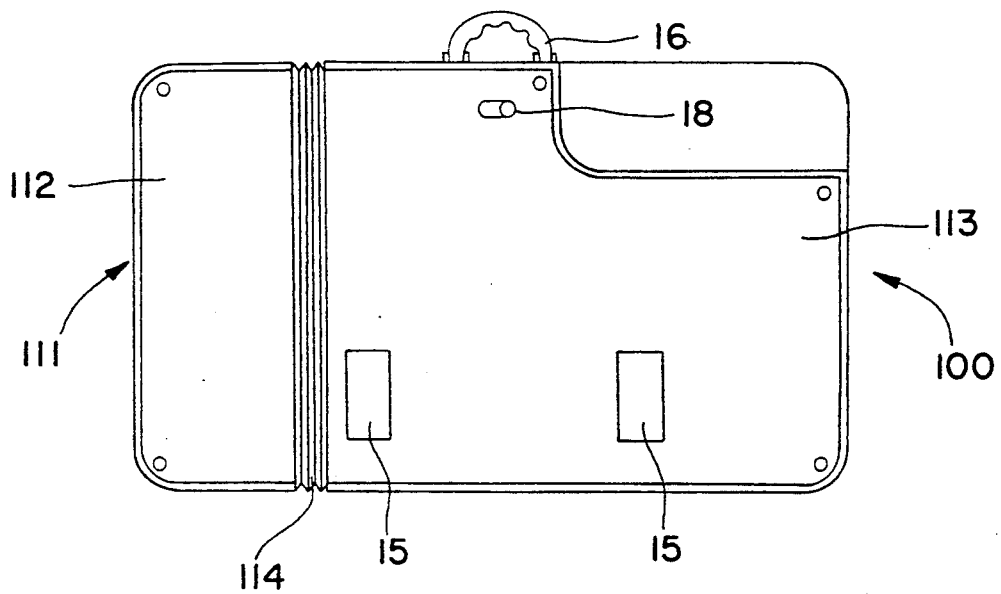
FIGS. 14-16 show a modified embodiment of the vehicle represented in FIGS. 1-10.
Figure 16:
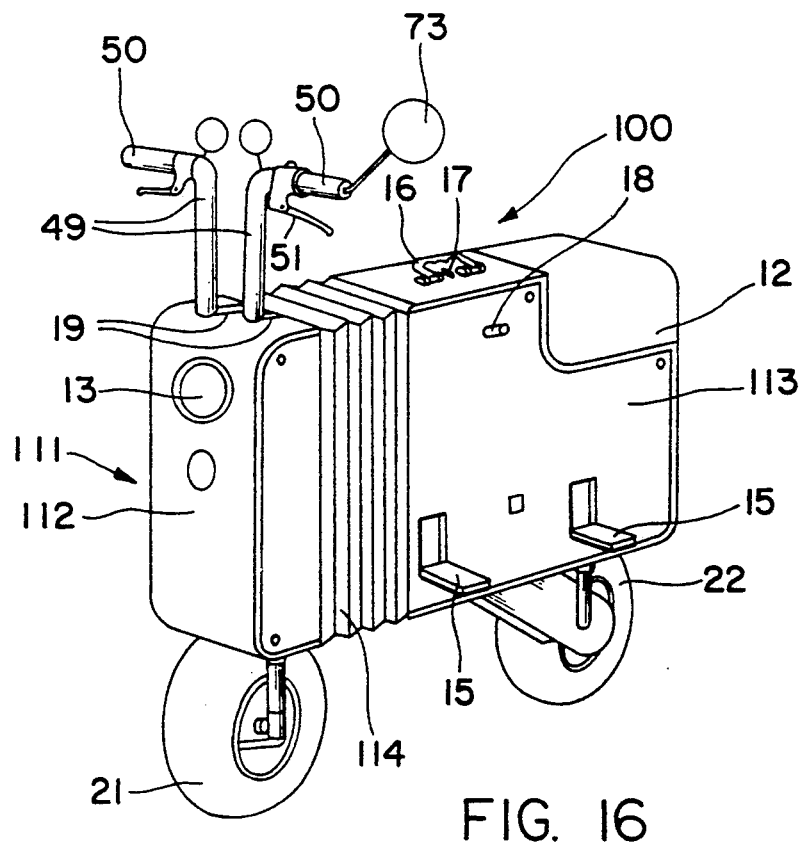
Figure 15:
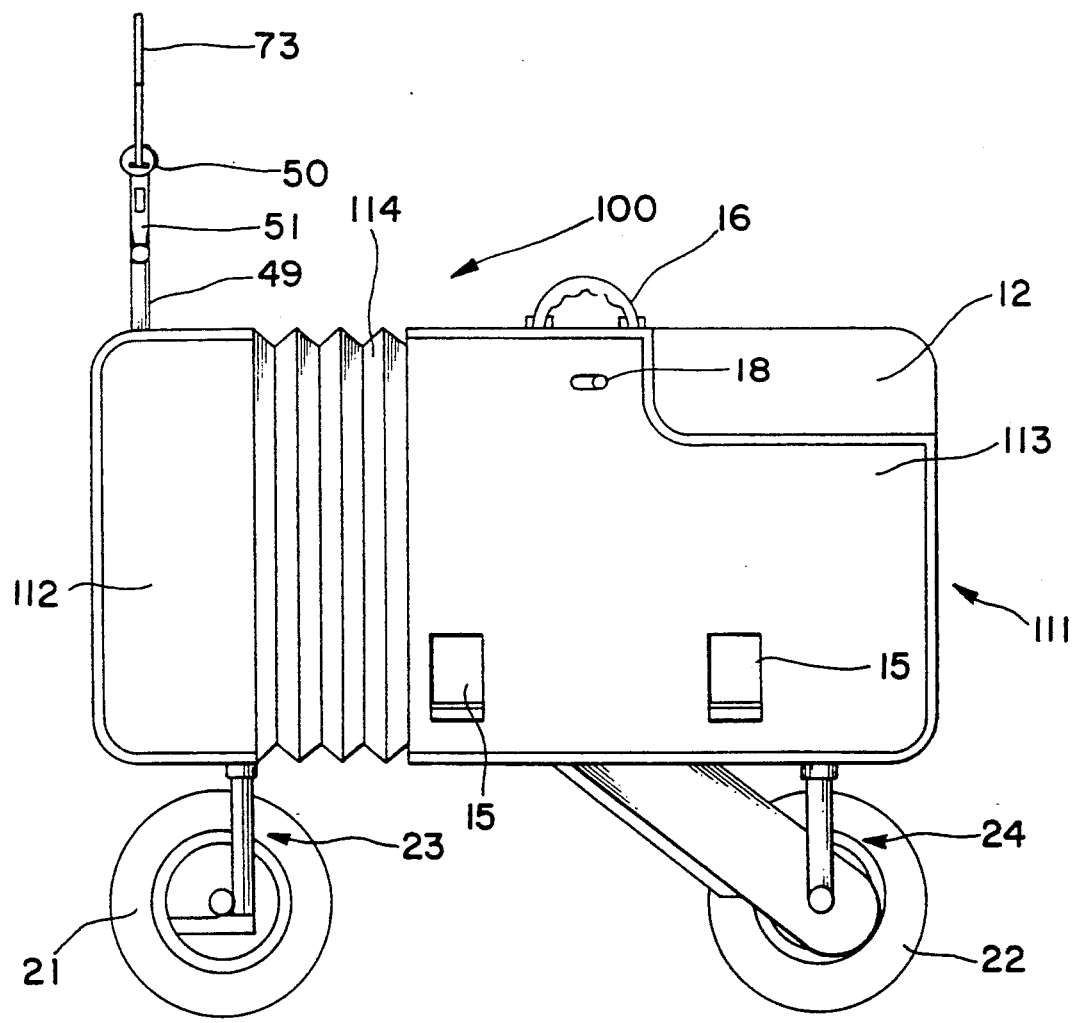

In FIGS. 14–16, there is illustrated a motor bicycle indicated as a whole by reference number 100 which represents a modified embodiment of the one indicated by reference number 10 described above.

In this case the body 111 is formed of two telescopic parts 112 and 113 which are connected by a bellows 114 of appropriate material so that said body is optionally estensible or shortenable.

In the motor bicycles 10 and 100 the wheels 21 and 22 could be retracted only partially inside the body 11 or 111 under rest conditions and could be extracted only partially from said body in operating conditions.

Instead of a motor bicycle inside the body 11 or 111 could be housed an extensible bicycle.

The proposed extensible vehicle being contained in its body in the form of a suitcase has various advantages such as great ease of handling, rapidity and facility of use, small space requirements and an attractive appearance.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. An extensible vehicle comprising:
   a hollow body having a generally rectangular shape;
   a seat provided on said body;
   a power unit provided in said body;
   wheels and associated suspensions movable from a use position outside said body to a storage position at least partially within said body, the wheels being operatively connected to the body through the associated suspensions;
   handle bars movable from a use position outside said body to a storage position at least partially within said body; and
   first actuation means provided on said body for moving the wheels and associated suspensions between the use and storage positions, said first actuation means includes a piston and cylinder operated by fluid pressure and a control device, the piston and cylinder moving the wheels and associated suspensions out of the body to the use position in response to activation of the control device and in response to deactivation of the control device, the piston and cylinder moves the wheels and the associated suspensions to the storage position.

2. The extensible vehicle in accordance with claim 1, further comprising a second actuation means for moving the handle bars from the storage position to the use position in response to activation of the control device and for moving the handle bars back to the storage position in response to deactivation of the control device.

3. The extensible vehicle in accordance with claim 2, further comprising means for rotating the handle bars about 90° during movement from the storage to the use positions, the handle bars extending in a direction of side-to-side of the body in the use position and in a direction of front-to-back of the body in the storage position.

4. The extensible vehicle in accordance with claim 3, wherein each of the handle bars has a longitudinal rod and wherein the means for rotating comprises at least one pin integral with each of the rods of the handle bars and at least one tubular sheath having a partially helical groove therein, the pins being engaged with the groove such that upon raising or lowering of the handle bars between the storage and use positions, the pins follow the groove to thereby rotate the handle bars.

5. The extensible vehicle in accordance with claim 4, wherein the at least one tubular sheath is rotatably supported within said body and is operatively connected to one of the wheels by motion transmission means, the motion transmission means transmits rotation of the handle bars through the rods during steering of the vehicle.

6. The extensible vehicle in accordance with claim 2, wherein the handle bars are in at least one plane generally parallel to a longitudinal plane of the body when in the storage position and in the use position, the handle bars are in a plane generally perpendicular to the longitudinal plane of the body.

7. The extensible vehicle in accordance with claim 2, wherein the second actuation means comprises a piston and cylinder operated by fluid pressure, the second actuation means being positioned within said body.

8. The extensible vehicle in accordance with claim 7, further comprising a source of pressurized fluid, a discharge tank and a slide valve in said body, the slide valve being operatively connected to the piston and cylinders of both the first and second actuation means, the slide valve supplying the pressurized fluid from the source to the piston and cylinders and permitting discharge of the pressurized fluid from the piston and cylinders to the discharge tank under control of the control device, the control device includes a button on the outside of the body and an electromagnet operatively associated with the slide valve, the electromagnet moves the slide valve upon actuation of the button by an operator to supply the pressurized fluid to or to permit discharge of the pressurized fluid from the piston and cylinders to thereby move the handle bars, wheels and associated suspensions between the use and storage positions.

9. The extensible vehicle in accordance with claim 1, further comprising a source of pressurized fluid, a discharge tank and a slide valve in said body, the slide valve being operatively connected to the piston and cylinder of the first actuation means, the slide valve supplying the pressurized fluid from the source to the piston and cylinder and permitting discharge of the pressurized fluid from the piston and cylinder to the discharge tank under control of the control device, the control device includes a button on the outside of the body and an electromagnet operatively associated with the slide valve, the electromagnet moves the slide valve upon actuation of the button by an operator to supply the pressurized fluid to or to permit discharge of the pressurized fluid from the piston and cylinder to thereby move the wheels and associated suspensions between the use and storage positions.

10. The extensible vehicle in accordance with claim 1, wherein the body has a top and bottom with the seat being provided on the top of the body and the wheels and associated suspensions being movable through an opening in the bottom of the body.

11. The extensible vehicle in accordance with claim 1, wherein the body is formed as a suitcase further comprising a handle attached to the body, said handle enabling an operator to carry the body when the handle bars, wheels and associated suspensions are in the storage position.

12. The extensible vehicle in accordance with claim 1, wherein the body is monocoque and acts as a frame for the vehicle.

13. The extensible vehicle in accordance with claim 1, wherein the seat is incorporated on a top side of the body.

14. The extensible vehicle in accordance with claim 13, wherein the seat is pivotably attached to the body and is fixed by a lock and key associated with the body.

15. The extensible vehicle in accordance with claim 14, wherein the seat is pivotable between a raised position and a lowered position, and further comprising a drawer located within the seat, the drawer being openable when the seat is in the raised position.

16. The extensible vehicle in accordance with claim 1, wherein said body is formed of two telescopic parts and further comprising a bellows connecting the two telescopic parts.

* * * * *